June 24, 1969     H. R. SCHREINER     3,451,825

METHOD FOR ACCELERATING THE AGING OF FRESHLY SLAUGHTERED MEAT

Filed Dec. 9, 1964     Sheet 1 of 2

INVENTOR.
HEINZ R. SCHREINER
BY
Barnwell P. King
ATTORNEY

United States Patent Office 3,451,825
Patented June 24, 1969

3,451,825
METHOD FOR ACCELERATING THE AGING OF FRESHLY SLAUGHTERED MEAT
Heinz R. Schreiner, Tonawanda, N.Y., assignor to Union Carbide Corporation, a corporation of New York
Filed Dec. 9, 1964, Ser. No. 416,997
Int. Cl. A22c; A23j
U.S. Cl. 99—107                                3 Claims

ABSTRACT OF THE DISCLOSURE

Accelerated aging of freshly slaughtered meat may be accomplished without adversely affecting the rapid tenderization of the meat by exposing it for 12 to 48 hours to an atmosphere containing at least 70% oxygen, at a pressure of 30 to 80 p.s.i.g. and a temperature of 34 to 44° C.

This invention relates to meat treating, and more particularly to the accelerated aging (tenderizing) of meat, especially fresh beef.

The invention provides for the accelerated aging of freshly slaughtered meat by exposure to an atmosphere containing oxygen (purity 70–100%) at a pressure of 30–80 p.s.i.g. for a period of 12–48 hours at a temperature of 34–44° C. Such atmosphere and pressure are critical to inhibit bacterial growth, thereby retarding spoilage without adversely affecting rapid tenderization of the meat under such conditions.

Oxygen under superatmospheric pressure has a bacteriostatic effect which is utilized in the present invention to retard the growth of microorganisms on meat as it is rapidly aged at a temperature best suited for tenderizing of the meat.

Essentially the present process involves exposing cuts of meat of freshly slaughtered animals to a relatively high (70% +) concentration of oxygen in air or other suitable gas, such as nitrogen and/or argon, at the most suitable aging pressure and temperature for the minimum period of time necessary for proteolytic enzymes in the meat to exert their tenderizing action. Thus, the invention has the advantage of tenderizing fresh meat in a very short time, i.e., in a matter of hours compared to the days or weeks that were required in the past, without adversely affecting the quality of the meat.

Variables of the present process and their useful ranges are a total pressure of 30–80 p.s.i.g., a temperature of 34–44° C., an oxygen concentration of 70–100%, and a holding (treatment) time of 12–48 hours.

Figure 1:
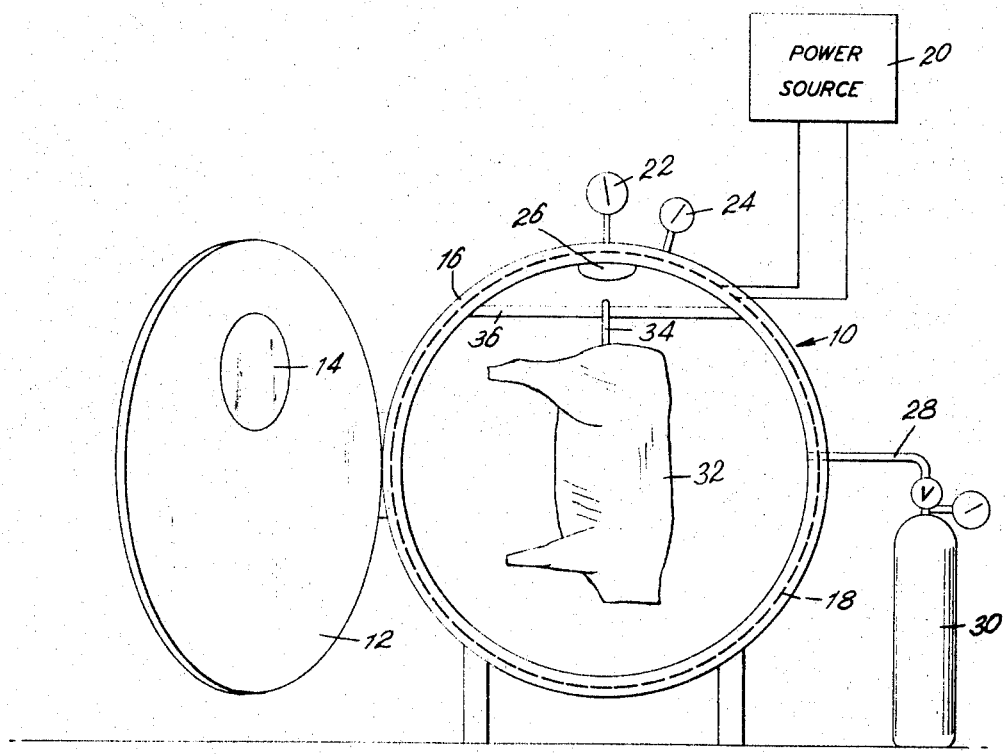
Figure 2:
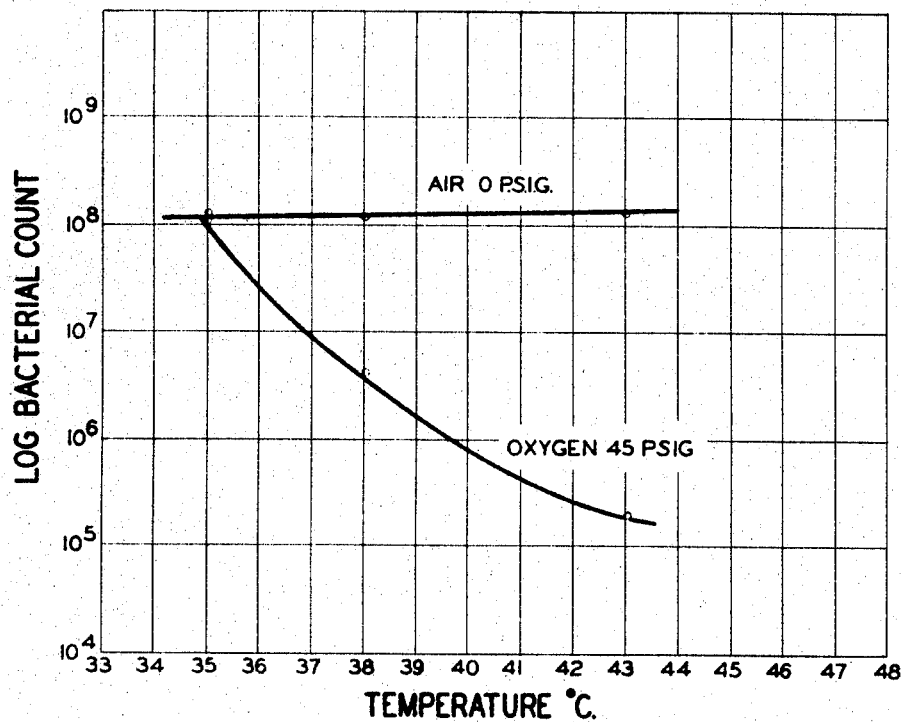

In the drawing:
FIG. 1 is a view mainly in front elevation of apparatus for carrying out the invention; and
FIG. 2 is a graphical representation—showing the effect of atmospheric air and oxygen, respectively, on actual bacterial counts of fresh meat with changes of temperature.

As shown in FIG. 1, apparatus for aging meat according to the invention includes an autoclave 10 having a hinged front door 12 provided with a window 14. The wall 16 of the autoclave is insulated and contains a heating element 18 that is connected to a source 20 of electrical power. The autoclave is also provided with temperature and pressure gauges 22 and 24, as well as a lamp 26. Oxygen gas is supplied to the autoclave by a pipe 28 from a pressurized oxygen cylinder 30.

In use, fresh meat 32 is hung by a hook 34 supported by a cross beam 36 in the autoclave 10. The door 12 is closed and the temperature, pressure and oxygen concentration of the atmosphere within the autoclave are set.

Preferred conditions are a total pressure of 45 p.s.i.g., a temperature of 40° C., an oxygen concentration of 95% and a holding time of 24 hours. When the meat 32 is subsequently removed from the autoclave, such conditions result in a tenderized product notwithstanding the relatively short period of treatment.

An important novel feature of the present process is the marked increase in effectiveness of pressurized oxygen in retarding bacterial growth as the holding temperature is increased from 35 to 43° C. This is illustrated (FIG. 2) by the following representative data:

| Temp., ° C. | Average number of bacteria/gram of meat after 24 hours of exposure to 45 p.s.i.g. of— | |
|---|---|---|
|  | Air | Oxygen |
| 35 | $1.8 \times 10^8$ | $1.2 \times 10^6$ |
| 38 | $1.1 \times 10^8$ | $5.8 \times 10^6$ |
| 43 | $2.7 \times 10^8$ | $4.0 \times 10^5$ |
| Control [1] | $1.2 \times 10^4$ |  |

[1] Meat sample maintained in air at 0 p.s.i.g. for 40 hours at 4° C.

Thus, at 43° C., for example, meat exposed to 45 p.s.i.g. of air contains 675 times as many bacteria as does meat exposed to 45 p.s.i.g. of oxygen for the same period of time. Under these conditions, the beneficial bacteriostatic effect of oxygen under pressure according to the present invention is unexpectedly enhanced to a great degree.

What is claimed is:
1. A method for accelerated aging of freshly slaughtered meat, without adversely affecting the rapid tenderization thereof comprising: exposing said meat for 12 to 48 hours to an atmosphere containing 70 to 100% oxygen, at a pressure of 30 to 80 p.s.i.g. and a temperature of 34 to 44° C.

2. The method of claim 1 wherein the atmosphere contains about 95% oxygen, wherein the pressure is about 45 p.s.i.g., the temperature is about 40° C., and the period of exposure is about 24 hours.

3. The process of claim 1 wherein the meat is beef.

References Cited

UNITED STATES PATENTS

| 876,806 | 1/1908 | Janitzky | 99—157 |
| 2,519,931 | 8/1950 | Roschen et al. | 99—107 |
| 2,711,373 | 6/1955 | Coleman et al. | 99—107 |
| 2,963,369 | 12/1960 | Urbain | 99—107 |
| 3,047,404 | 7/1962 | Vaughan | 99—157 X |

HYMAN LORD, *Primary Examiner.*